United States Patent Office 2,908,966
Patented Oct. 20, 1959

2,908,966

TITANIUM OR ZIRCONIUM CLAD STEEL

Frank C. Wagner, Solon, Ohio, assignor to Horizons Incorporated

No Drawing. Application January 26, 1955
Serial No. 484,299

2 Claims. (Cl. 29—194)

This invention relates to the cladding of steel with a corrosion-resistant metal. More particularly it relates to the cladding of steel with a layer of titanium or zirconium.

The exceptional resistance of titanium and zirconium to corrosion when exposed to corrosive liquids and atmospheres is well known. Titanium, for example, is in a class with platinum in resisting attack by marine atmospheres, and also has outstanding resistance to attack by many acids. Zirconium is also extremely inert to a variety of strong acids and corrosive atmospheres. The corrosion-resistant properties of titanium and zirconium make these metals very desirable for use as structural materials in many commercial applications. At the present time, however, these metals are relatively expensive and are in short supply, factors which prohibit their extensive use for general structural purposes.

A known expedient for utilizing the corrosion-resistant properties of high cost materials such as titanium and zirconium comprises cladding a less costly base metal with a layer of the corrosion-resistant material to form a composite bi-metallic material that can be fabricated into desired structural shapes and apparatus. Accordingly it has been proposed that a structural base metal, such as mild steel, be clad with a layer of titanium or zirconium in order to take advantage of both the low cost and high strength of the steel base metal and the exceptional corrosion-resistant properties of the cladding metal.

Various procedures for cladding mild steel plate with a layer of titanium or zirconium have been suggested, and one of the most interesting of these involves the diffusion bonding of the cladding layer to the base metal by means of a high temperature pressure welding operation. In this operation, the steel base metal and the cladding layer of titanium or zirconium are brought intimately together with great force and at relatively high temperatures to obtain a solid state diffusion bond between the steel and the titanium or zirconium. Commonly the necessary intimate contact between the two metal layers is accomplished by passing the assembled layers through a strand of rolls capable of exerting the relatively great pressure required. Although titanium and zirconium will form a diffusion bond with mild steel under these conditions, it has been found that the bond is imperfect and is subject to rupture due to the formation of oxide films on the surfaces of the metals and especially to the formation of brittle alloys of the two metals at the interface of the metals. The brittle inter-metallic compounds which form at the interface of the two metals are inherent in both the iron-titanium and the iron-zirconium alloy systems. The formation of these brittle intermetallic compounds causes the bond between the iron and the cladding metal to be weak so that the resulting composite metal plate is not amenable to the usual forming processes.

I have now found it possible to clad mild steel plate with a layer of titanium or zirconium while avoiding the formation of the undesirable iron-titanium or iron-zirconium intermetallic compounds. Pursuant to my discovery, the layer of corrosion-resistant metal is firmly bonded to the steel base metal through the agency of an intermediate layer of a bonding metal selected from the group consisting of chromium, cobalt, molybdenum and silver. The clad steel product of the invention is produced by forming a composite of a layer of steel base metal, an intermediate layer of one of the bonding metals chromium, cobalt, molybdenum, or silver and a cladding layer of one of the corrosion-resistant metals titanium and zirconium. The metal composite is heated to a temperature of at least 1400° F. in an inert atmosphere and the several layers of the composite are compressed together while at this temperature to effect a reduction in the thickness of the composite of about one-half of its initial thickness.

The method of my invention results in the formation of a composite clad steel product in which the steel base metal is firmly bonded to a layer of corrosion-resistant titanium or zirconium. The steel base metal may comprise any mild steel plate suitable for use in the fabrication of the corrosion-resistant equipment ultimately to be built. The thickness of the steel plate in the composite is determined by the structural characteristics desired of the resulting composite metal product. The titanium and zirconium of the composite metal product initially are in the form of a sheet of the metal the thickness of which is determined by the availability of the metal and the use to which the composite product is to be put. Advantageously, the thickness of the plate of titanium and zirconium is within the range of about one-sixteenth to one-quarter of an inch, but thicker and thinner plates may be used. The cladding layer should be of commercial purity, that is it should be free from embrittling impurities and from any alloying metal which would impair the usefulness and the corrosion resistance of the composite metal product.

The layer of bonding metal disposed between the steel base metal and the corrosion resisting sheet of titanium or zirconium pursuant to my invention prevents the formation of undesirable iron-titanium and iron-zirconium compounds. The materials which I have found useful for this purpose are, as hereinbefore stated, chromium, cobalt, molybdenum and silver. The chromium, cobalt and silver are most conveniently incorporated in the composite metal product by electroplating these metals on the surface of the cladding layer of titanium or zirconium. The chromium, cobalt and silver are plated on the surface of the cladding metal from aqueous solutions of salts of cobalt or chromium or silver by means of conventional electroplating procedures. Molybdenum, on the other hand, can be readily fabricated into a thin sheet and is advantageously incorporated in the composite metal assembly in this form. Although chromium and silver will each form a satisfactory bond with mild steel under the conditions employed in my process, I prefer, after electroplating the titanium with a layer of chromium, or silver, to electrodeposit on the chromium or silver a supplementary layer of nickel which forms a diffusion bond with the mild steel base metal somewhat more readily than does either chromium or silver. The thickness of the intermediate bonding metal disposed between the two major components of the composite metal assembly must be sufficient to insure a firm bond between both the bonding metal and the steel base metal and between the bonding metal and the corrosion-resistant metal. The thickness of the bonding metal layer is therefore advantageously within the range of about 0.5 to 5 mil, although bonding layers outside this thickness range may be used effectively in some instances.

The pressure welding of the corrosion-resistant metal and the intermediate layer of bonding metal to the steel base metal must be carried out at moderately high temperatures. A temperature of at least about 1400° F. is required for efficient pressure welding of the several components of the composite metal assembly. For optimum bonding of chromium and nickel-plated chromium to the mild base plate, I presently prefer to use a temperature within the range of about 1600° F. to 1800° F. For cobalt, I prefer to use a temperature within the range of 1400° to 1500° F., for molybdenum a temperature within the range of 1800° to 2000° F. and for silver and nickel-plated silver a temperature within the range of 1400° to 1800° F. It must be understood, however, that these preferred ranges are for temperatures which lead to most efficient operation and that other temperatures, provided they are at least as high as about 1400° F., are effective in practicing the invention.

The bonding of the steel base metal to the layer of bonding metal at the aforementioned elevated temperatures pursuant to my invention must be carried out under conditions which avoid the formation of a surface oxide film that otherwise would form on the steel base metal when it is heated in the presence of the ambient oxidizing atmosphere. I have found that these conditions can be satisfied by transforming the metal assembly into a gas-tight casing and establishing within the resulting gas-tight casing the necessary inert atmosphere so that conventional rolling equipment can be employed to effect the pressure-welding operation.

To form the aforesaid gas-tight casing, a mild steel base metal plate, an intermediate layer of bonding metal, a cladding layer of titanium or zirconium, and a temporary covering layer of mild steel or similar material are assembled to form a composite metal sandwich. To prevent the temporary covering layer from becoming bonded to the adjoining corrosion-resistant metal, the adjacent surface of the titanium or zirconium is advantageously coated with a thin film of colloidal graphite. Strips of mild steel or the like are then welded to the proximate edges of the steel base layer and the temporary steel covering layer of the composite assembly to form the gas-tight casing enclosing the corrosion resistant metal. All air is withdrawn from the inside of the casing thus formed and is replaced with an inert gas such as argon. The argon-filled casing is then heated to the aforementioned bonding temperature and the casing is passed between conventional reducing rolls so as to reduce the thickness of the composite assembly by about 50%. On completion of the rolling operation, the edge strips welded to the base plate and to the temporary covering plate are cut away. The covering plate is then removed from the composite assembly exposing the corrosion resistant layer of the composite metal assembly. The resulting assembly comprises the desired titanium or zirconium-clad base metal.

The following examples are illustrative, but not limitative, of the practice of my invention:

*Example I*

A piece of commercially pure titanium 2 x 2 x ⅛ inches was plated with cobalt to a thickness of about one mil. The plating bath consisting of an aqueous solution of cobaltous sulphate and the electrolysis was carried out at a temperature of 100° F. at a current density of 4 amps./dm.² One surface of the plated titanium was coated with a film of colloidal graphite and the titanium was placed between two clean pieces of mild steel 3 x 3 x ⅜ inches. Spacers of mild steel strip were placed between the two steel plates adjacent the edges of the titanium and the corresponding edges of the steel plates. The steel strips were then welded to the proximate edges of the two steel plates thus forming a gas-tight casing from the composite assembly. A small hole communicating with the interior of the casing was formed in the weld and spacer strip and a ⅛ inch diameter pipe was welded to the edge of the casing at this hole.

The pipe was connected to a vacuum pump and the space within the casing was evacuated to a pressure of about 20 microns. The interior of the casing was then filled with dry argon gas. The assembly was heated to 1450° F. and reduced by rolling to about 50% of its original thickness. On completion of the rolling operation the continuous weld connecting the two steel plates was cut away and the temporary cover plate was removed. The resulting product comprises a steel base plate to which was firmly bonded a layer of titanium less than 1/16 inch thick. The colloidal graphite used to prevent bonding of the titanium to the steel cover plate had no observable effect on the titanium at the rolling temperatures employed. The titanium layer was firmly bonded to the steel base metal so that the composite metal plate could be subjected to severe working without evident separation of the layers of the composite.

*Example II*

A piece of commercially pure titanium was plated with chromium electrodeposited thereon from an aqueous solution. One surface of the chromium plated titanium sheet was then assembled with a base plate of mild steel, a similar covering of mild steel, and steel spacer strips to form a gas-tight casing in the manner described in Example I. After establishing an inert atmosphere within the gas-tight casing, the assembly was rolled at a temperature of 1800° F. to reduce the thickness of the assembly by about 50%. The edge strips welded to the edges of the assembly were then cut away and the covering plate removed to expose the corrosion resistant layer of the composite metal plate. The titanium was firmly bonded to the steel base metal and the composite assembly was subjected to severe working without appreciable separation of the layers of the assembly.

*Example III*

A chromium plated plate of commercially pure titanium was plated with a supplementary layer of nickel. The nickel-chromium plated titanium was then assembled in a gas-tight casing and roller at a temperature of 1800° F. as in Example II. On completion of the rolling operation, the edge strips were cut away from the assembly and the cover plate removed. The resulting titanium clad steel plate was subjected to severe working without apparent separation of the titanium from the steel base metal.

*Example IV*

A composite assembly comprising a mild steel base plate, an intermediate bonding layer of molybdenum having a thickness of 2 mils, a sheet of titanium having a thickness of ⅛ inch, and a covering layer of mild steel was formed into a gas-tight casing by means of steel spacer strips welded to the edges of the steel base plate and the steel covering plate. An inert atmosphere was established within the casing and it was then rolled at a temperature of 1800° F. to reduce the thickness thereof by about 50%. The edge strips were cut away and the covering plate removed to expose a titanium clad steel plate having excellent working properties.

*Example V*

A piece of commercially pure titanium 2 inches x 2 inches x ⅛ inch was plated with silver to a thickness of about one mil. The plating was accomplished by employing three baths successively. The first strike was plated on thoroughly cleaned titanium at 20 amps./sq. ft. current density for a period of 10 seconds in an aqueous bath which included the cyanides of silver, copper, and sodium. A second 10 second strike in an aqueous silver cyanide sodium cyanide bath was electrodeposited at the same current density. The silver plating bath consisted of an aqueous solution of silver cyanide and potassium cyanide and the electroplating was carried out at a current density of 4 amps./sq. ft. and at a temperature of between 70° and 85° F.

The silver plated titanium sheet was assembled with a base plate of mild steel, a covering plate of mild steel and steel spacer strips to form a gas-tight casing in the manner described in Example I. An inert atmosphere was established within the gas-tight casing and the assembly was then rolled at 1740° F. to reduce the thickness of the assembly by about 50%. On completion of the rolling operation, the edge strips were cut away from the assembly and the cover plate was removed. The resulting titanium clad steel plate was subjected to severe working without any apparent separation of the titanium from the silver.

*Example VI*

Three pieces of commercially pure titanium were silver plated by the procedure set forth in Example V, and the silver plated pieces of titanium were then plated with a supplementary layer of nickel from a commercial low pH Watts bath. The nickel-silver plated titanium pieces were then assembled in a gas-tight casing and provided with an inert atmosphere by the procedure previously described and rolled at temperatures of 1685° F., 1600° F. and 1500° F. respectively. The edge strips of the gas-tight casing were then cut away and the cover plate was removed from the assembly. The resulting titanium clad steel plates were subjected to severe working and were found to be the most firmly bonded of all the materials fabricated in Examples I–VI.

*Example VII*

The procedures outlined in each of the foregoing examples were repeated using a plate of zirconium in place of the titanium to form a zirconium-clad steel product having, in each case, excellent working properties.

As seen from the foregoing description and examples, a corrosion-resistant metal-clad steel product can be formed pursuant to my invention which retains the corrosion-resistant properties of the cladding metal while taking advantage of the low cost and high strength of the steel base metal. The clad steel product of my invention may be formed into a variety of structural shapes and incorporated in apparatus in which the desirable characteristics of the product are of importance.

This application is a continuation in part of my copending application, Serial No. 433,285, filed May 28, 1954.

I claim:

1. A titanium-clad steel product characterized by the provision between the steel base metal and the layer of titanium of both an intermediate layer of silver adjacent the titanium and an intermediate layer of nickel adjacent the steel base metal.

2. A clad steel product comprising: a steel base having thereon a protective layer of a corrosion-resistant metal selected from the group consisting of titanium and zirconium; the steel base metal and the corrosion-resistant clad metal layer being separated by a layer of nickel adjacent the steel base and a layer of a metal from the group consisting of chromium and silver disposed between the layer of said corrosion-resistant metal and said nickel layer.

References Cited in the file of this patent

UNITED STATES PATENTS

| | | |
|---|---|---|
| 1,886,615 | Johnson | Nov. 8, 1932 |
| 2,160,558 | Orr | May 30, 1939 |
| 2,305,555 | Peters | Dec. 15, 1942 |
| 2,387,903 | Hensel | Oct. 30, 1945 |
| 2,665,475 | Campbell | Jan. 12, 1954 |
| 2,683,305 | Goetzel | July 13, 1954 |
| 2,786,265 | Keay | Mar. 26, 1957 |

OTHER REFERENCES

Sil Fas & Easy Flo Bulletin No. 12, published 1941, Handy Harman, pp. 5, 10.

Brazing Titanium to Titanium and to Mild and Stainless Steels, WADC Technical Report 52–313, par I by Lewis Rieppel and Voldrich Wright Air Development Center, published Nov. 1952.

WADC Technical Report, 53–502, December 1953.

Roll Cladding of Base Metals, by Peter F. Mataich and Clifton Wagner of Horizons Inc.

Aeronautical Research Laboratory, Wright Air Development Center, Wright-Patterson Air Force Base, Ohio.